Nov. 3, 1970        W. H. HORTON         3,537,909
                    BATTERY HOLDER

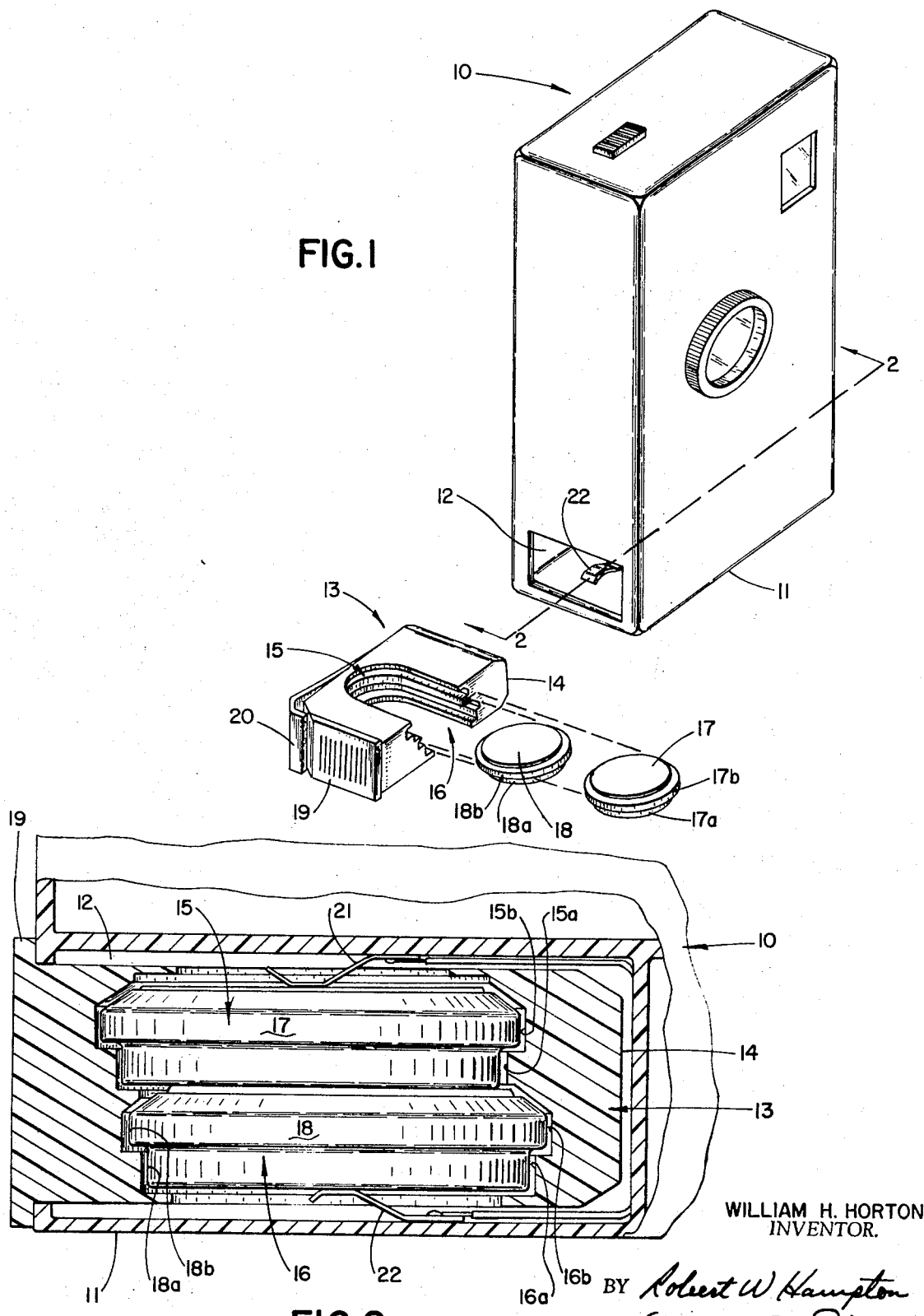

Filed Jan. 11, 1968                2 Sheets-Sheet 2

WILLIAM H. HORTON
INVENTOR.

BY Robert W Hampton
William C. Dixon, III

ATTORNEYS

United States Patent Office 3,537,909
Patented Nov. 3, 1970

3,537,909
BATTERY HOLDER
William H. Horton, Rochester, N.Y., assignor to Eastman Kodak Company, Rochester, N.Y., a corporation of New Jersey
Filed Jan. 11, 1968, Ser. No. 697,218
Int. Cl. H01m 1/04; G03b 19/04
U.S. Cl. 136—173
11 Claims

ABSTRACT OF THE DISCLOSURE

A holder for a plurality of electrical batteries has individual battery shaped cavities therein to receive and retain the batteries in operative relationship, the cavities being (1) staggered to prevent wrong-way insertion of the batteries, thus assuring correct polarity, and (2) dimensioned to allow sufficient clearance for ready insertion and removal of oversized and/or expanded batteries.

BACKGROUND OF THE INVENTION

Field of the invention

This invention relates to means adapted to receive and hold a plurality of electrical batteries in an operative relationship, and particularly to battery-holding means for receiving and maintaining in operative relationship a plurality of electrical batteries of the type commonly used with photographic or cinematographic cameras.

Description of the prior art

It is well known to provide means for receiving and holding a plurality of electrical batteries so that the batteries are (1) axially aligned with one another or (2) alongside one another. In either of those arrangements, however, if the individual battery receiving compartments, or cavities, are dimensioned to accommodate maximum-size batteries, i.e., if sufficient clearance is provided to allow for battery manufacturing tolerances and to permit easy removal of batteries that have expanded beyond their specified dimensions, then the batteries can inadvertently be inserted with incorrect orientation, i.e., in a series-opposing relationship and/or without regard to direction of polarity.

SUMMARY OF THE INVENTION

The present invention comprises a simple, compact, and inexpensive device for receiving and maintaining in correct orientation a plurality of electrical batteries of the type commonly used with photographic or cinematographic cameras. By "correct orientation" is meant that the batteries can be inserted only in a series-aiding relationship and polarized in one direction. In use with cameras such orientation is usually necessary to provide the voltage requisite for battery driven exposure-control systems, and is sometimes required for flash systems such as the battery capacitor type. In the illustrated preferred embodiment of this invention, individual battery receiving cavities are (1) made to conform in shape with the batteries to be inserted therein, (a) arranged in a staggered relationship, and (3) dimensioned to accommodate maximum-size batteries, thus utilizing the configuration of the batteries to preclude incorrect insertion while allowing sufficient clearance for battery manufacturing tolerances and battery expansion.

The various objects and advantages of this invention will become apparent in the detailed description of the illustrated preferred embodiment appearing below, and the novel features thereof will be particularly pointed out in connection with the appended claims.

BRIEF DESCRIPTION OF THE DRAWINGS

In the preferred embodiment described below, reference is made to the accompanying drawings, in which:

FIG. 1 is a perspective view of a camera having a compartment therein for receiving a battery holder according to a preferred embodiment of the present invention, with the battery holder shown beneath the camera to illustrate the manner in which the holder is inserted in the compartment;

FIG. 2 is an enlarged partial cross-sectional view of the camera of FIG. 1 taken through the battery holder compartment along line 2—2 of FIG. 1, showing in cross section the battery holder, with batteries inserted, in the compartment;

DESCRIPTION OF THE PREFERRED EMBODIMENT

Figure 3:
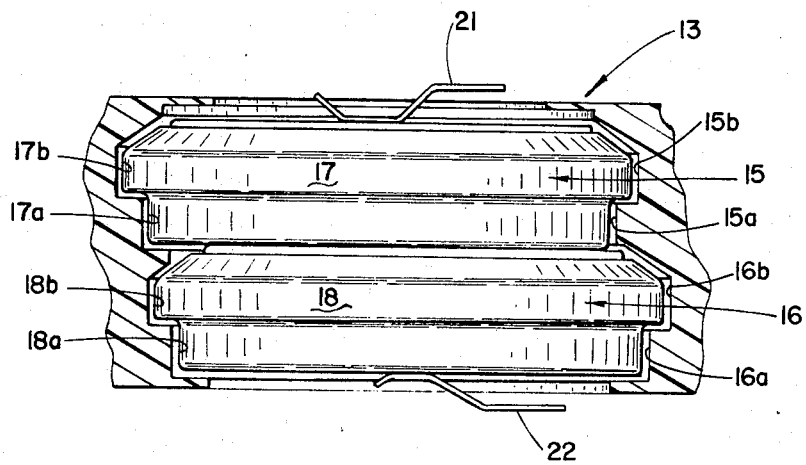
FIG. 3 is an enlarged partial cross-sectional view of the battery holder as seen in FIG. 2, showing internal details of the battery holder structure with batteries inserted therein.

The camera 10 shown in FIGS. 1 and 2 is of generally conventional design, comprising a boxlike housing 11 with a compartment 12 therein for receiving a holder 13 for electrical batteries 17, 18 that may be used to provide power for a photoflash, exposure-control, or other camera system. For illustrative purposes, a still-picture camera is shown, although a moving-picture camera or other battery powered apparatus would be equally appropriate. Similarly, the battery holder 13 is illustrated as being of the type that slides into and out of the compartment 12, although it could just as well be of the type that is pivotally attached to the camera housing for rotation into and out of a holder-receiving compartment.

As shown in FIG. 1, the battery holder 13 comprises a body portion 14, individual battery receiving cavities 15, 16, a grasping portion 19, and a latch 20. The batteries 17, 18 are shown to the right of the holder 13 in correct orientation for insertion in the cavities 15, 16, respectively, while the holder 13 is shown beneath the camera housing 11 in correct oientation for insertion in the compartment 12.

FIG. 2 shows, in cross section, the battery holder 13 fully inserted and latched in operative position in the compartment 12 of the housing 11. Inserted in the cavities 15, 16 of the holder 13 are the batteries 17, 18, respectively, shown in operative engagement with spring-type electrical contacts 21, 22 of a camera circuit (not shown).

FIG. 3 shows the configuration and relative positions of the cavities 15, 16 with the batteries 17, 18 inserted therein to illustrate their shape and size relative to those of the cavities.

It will be noted that the batteries 17, 18 are round and comprise small-diameter portions 17a, 18a and large-diameter portions 17b, 18b. Batteries of such configuration that are comonly used in present-day cameras have small and large diameters of approximately 0.815 in. and 0.900 in., respectively, and vary in overall thickness between contact surfaces of opposite polarity, within specified manufacturing tolerances, from 0.215 in. to 0.228 in.

To accommodate batteries of this type in the illustrated battery holder of the present invention, individual battery receiving cavities are provided that (1) conform substantially with the shape of the batteries, (2) are offset one with another in staggered relationship, and (3) are dimensioned to assure sufficient clearance for ready insertion and removal of oversized and/or expanded batteries, with the result that insertion of incorrectly oriented batteries is precluded.

Accordingly, the battery cavities 15, 16 are U-shaped to permit insertion of the batteries 17, 18 from the side of the holder 13 opening into said cavities, as shown in FIG. 1, and to conform substantially with the circular shape of said batteries when fully inserted. And, as can best be seen in FIG. 3, the battery receiving cavities 15, 16 also comprise small-diameter portions 15a, 16a and large-diameter portions 15b, 16b that correspond with the small- and large-diameter portions 17a, 18a and 17b, 18b, respectively, of the batteries 17, 18, thus further conforming the individual cavities with the shape of the batteries to be inserted therein.

Figure 4:
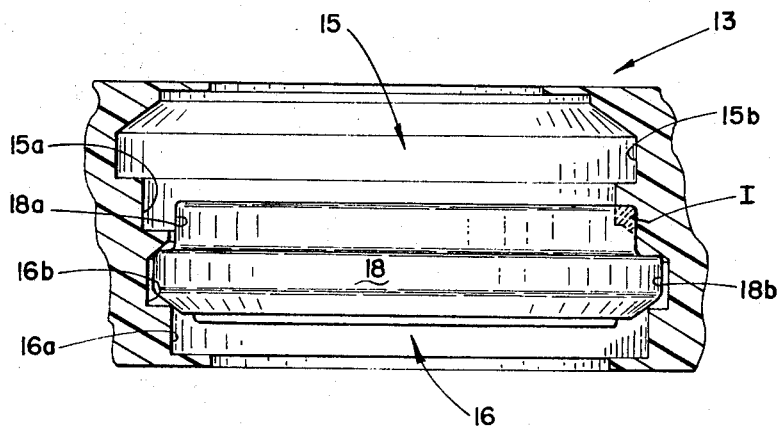
FIG. 4 is an enlarged partial cross-sectional view of the battery holder as shown in FIG. 3, indicating a zone of interference encountered when it is attempted to insert a battery incorrectly.
Figure 5:
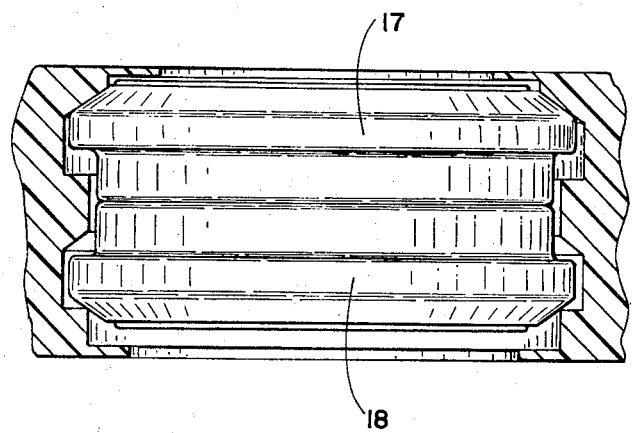
FIG. 5 is an enlarged partial cross-sectional view of a battery holder differing from that of the present invention in that the individual battery receiving cavities are shown axially aligned as in some holders known in the prior art, showing one battery inserted upside down.

The reason for offsetting, or staggering, the cavities 15, 16 is best seen in FIG. 4, which shows an interference zone I in the body portion 14 that is encountered when it is attempted to insert a battery incorrectly. If the cavities 15, 16 were axially aligned with one another as in known battery holders, instead of offset as here, such interference would not occur and a minimum-size battery could be inserted upside down as shown in FIG. 5.

FIG. 3 illustrates not only the offset position and conforming shape of each battery receiving cavity in the holder 13 but also the cavity's greater size and resulting clearances relative to an inserted battery. As aforesaid, a common size of the type of battery here shown has a maximum thickness between opposing contact surfaces of, within specified manufacturing tolerances, 0.228 in. A corresponding dimension that has been successfully used for the thickness, or longitudinal height, of each battery receiving cavity in the holder 13 is 0.240 in., which allows longitudinal clearance not only for maximum-tolerance batteries but for oversized and/or expanded batteries as well.

As shown in FIGS. 2 and 3, the spring-type electrical contacts 21, 22, connected to a camera circuit (not shown), bear against corresponding contact surfaces of the inserted batteries 17, 18, respectively, when the holder 13 is fully inserted in the compartment 12. Such contacts resiliently press the batteries 17, 18 together and thereby assure electrical contact between the batteries 17, 18 at their interface notwithstanding the above-described clearance between each battery and the cavity in which it has been inserted.

As can now be seen from the foregoing description, in the illustrated embodiment of this invention there is provided a simple, compact, and inexpensive device for receiving and maintaining in correct orientation a plurality of electrical batteries of the type shown. The body portion 14, with the battery receiving cavities 15, 16 therein as described, may conveniently be made as one piece of molded plastic. A holder 13 having individual battery receiving cavities 15, 16 that are shaped, offset, and sized in accordance with this invention will permit ready insertion and removal of oversized and/or expanded batteries when correctly oriented but will not permit insertion even of minimum-tolerance or reasonably undersized batteries when incorrectly oriented, thus ensuring insertion of batteries polarized in one direction only and in a series-aiding relationship.

The invention has been described in detail with particular reference to a preferred embodiment thereof, but it will be understood that variations and modifications can be effected within the spirit and scope of the invention as described hereinabove and as defined in the appended claims.

I claim:
1. An article for receiving and retaining in operative orientation a plurality of electrical batteries, said article comprising:
 (a) a body portion;
 (b) a plurality of adjacent cavities defined by said body portion; and
 (c) an entrance defined by said body portion to each of said cavities, each entrance
  (1) including at least two adjacent entrance portions having a common central axis, each of said entrance portions having sets of opposed boundaries on opposite sides of said axis, the opposed boundaries of adjacent sets being separated at their place of maximum separation by different predetermined distances, and
  (2) being arranged in said body portion in a staggered, overlapping relationship with an adjacent entrance so that said entrance axis is offset from the axis of an adjacent entrance to prevent a portion of the entrance of one cavity from receiving a portion of the battery entering an adjacent entrance.

2. An article as defined in claim 1 wherein said entrances are arranged in a common attitude to receive batteries oriented in one direction only.

3. An article as defined in claim 1 wherein said opposed boundaries of each of said sets are separated by distances no less than the maximum dimensions of battery portions to be received therebetween.

4. In a camera, means for receiving and retaining a plurality of batteries comprising:
 a body portion defining a plurality of cavities each having an entrance, said entrance having a central axis and a cross-sectional area including first and second coaxial portions having different dimensions transverse to the axis of that entrance wherein said entrance axis is offset from that of an adjacent entrance to prevent a portion of the entrance of one cavity from receiving a portion of the battery inserted in an adjacent entrance, whereby misorientation of said batteries is prevented.

5. An article as defined in claim 4 wherein said entrances are arranged in a common attitude to receive batteries oriented in one direction only.

6. An article as defined in claim 4 wherein
 (a) said entrances are arranged in a common attitude to receive batteries oriented in one direction only; and
 (b) each of said entrances is sized to provide sufficient clearance for ready insertion and removal of a battery exceeding one of its specified dimensions.

7. In a camera, means for receiving and retaining a plurality of batteries comprising: a body portion defining a plurality of cavities, each of said cavities having an axis and a cross-sectional area including first and second coaxial portions having different dimensions transverse to the axis of that cavity, wherein said axis of one cavity is offset from that of an adjacent cavity to prevent a portion of a cavity from receiving a portion of the battery inserted in an adjacent cavity, whereby misorientation of said batteries is prevented.

8. The invention defined in claim 7 wherein said first portion of one of said cavities adjoins said second portion of an adjacent cavity to permit insertion of batteries oriented in one direction only.

9. The invention defined in claim 8 wherein said camera includes electrical contacts for contacting received batteries, and said body portion has a first side open to said first portion of one of said cavities and a second side open to said second portion of another of said cavities to permit electrical contacting engagement of batteries received in said cavities with electrical contacts in said camera.

10. The invention defined in claim 8 wherein each of said cavities has a generally U-shaped cross-sectional area in a plane transverse to said cavity axes to permit insertion of a battery through an open end of each cavity and seating of said battery in a closed, substantially semicircular end of each cavity; wherein the plane containing said U-shaped cross-sectional area of one of said cavities is substantially parallel with the corresponding planes containing said U-shaped cross-sectional areas of the other of said cavities; and wherein the open end of said one cavity adjoins the open end of an adjacent cavity at a side of said body portion to permit insertion of batteries in each of said cavities from the same side of said body portion.

11. An article for receiving and retaining in operative orientation a plurality of electrical batteries, said article comprising:
 (a) a body portion;
 (b) a plurality of adjacent cavities defined by said body portion; and
 (c) an entrance defined by said body portion to each of said cavities, each entrance
  (1) having a central axis and at least two coaxial entrance portions, each entrance portion being bounded on opposite sides of said axis by sets of opposed parallel edges, the edges of adjacent sets being separated by different amounts, and
  (2) being arranged in said body portion in a staggered, overlapping relationship with an adjacent entrance so that said entrance axis is offset from the axis of an adjacent entrance to prevent a portion of the entrance of one cavity from receiving a portion of the battery entering an adjacent entrance.

References Cited

UNITED STATES PATENTS

| | | | |
|---|---|---|---|
| 844,283 | 2/1907 | Meaker | 206—.84 |
| 2,116,091 | 5/1938 | Williams. | |
| 2,221,072 | 11/1940 | Bennett | 206—.84 |
| 2,578,134 | 12/1951 | Headrick | 206—.84 |

FOREIGN PATENTS 1,237,515  6/1960  France.

WINSTON A. DOUGLAS, Primary Examiner

D. L. WALTON, Assistant Examiner

U.S. Cl. X.R.

95—31; 206—.84